Patented July 7, 1925.

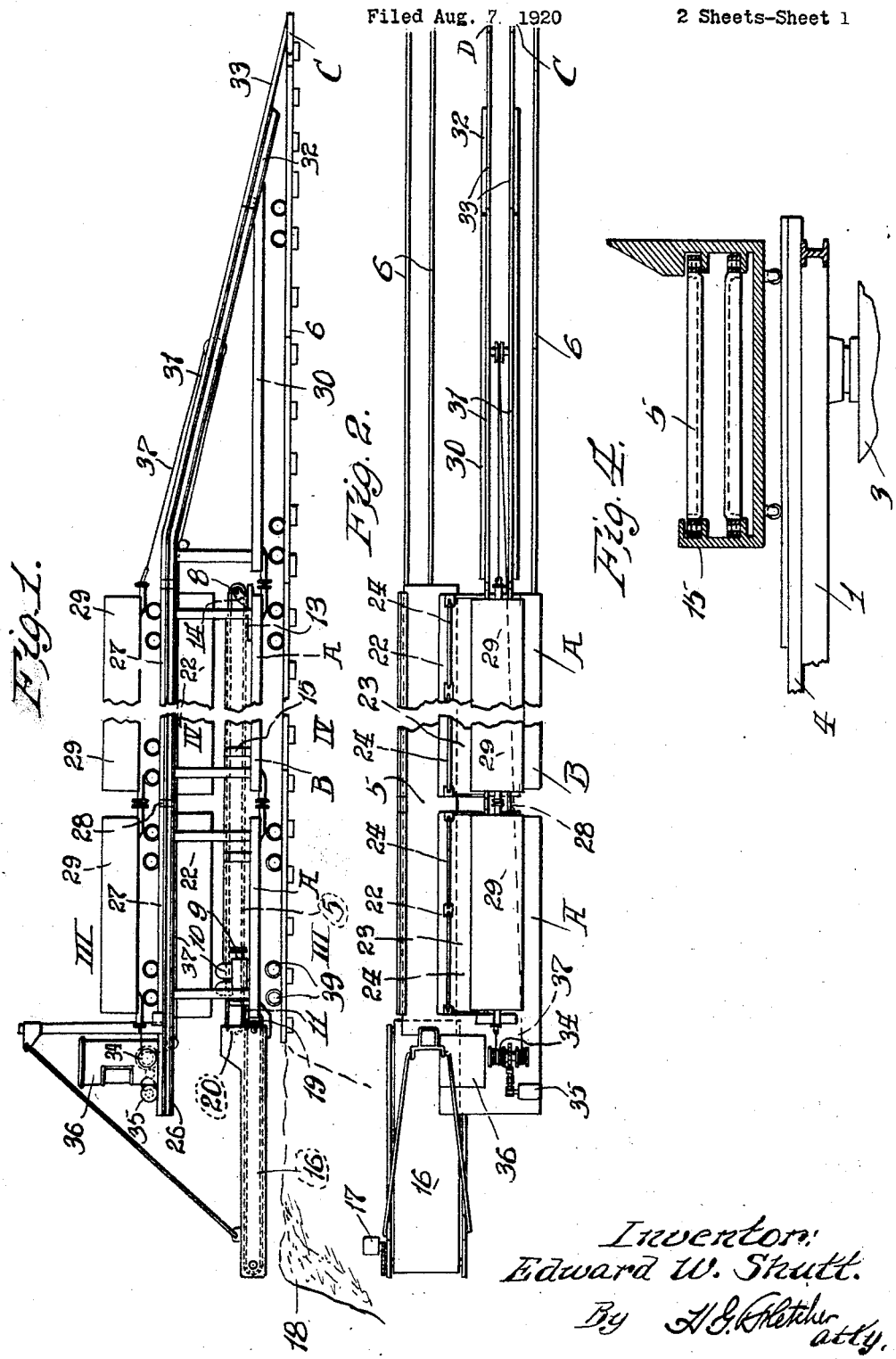

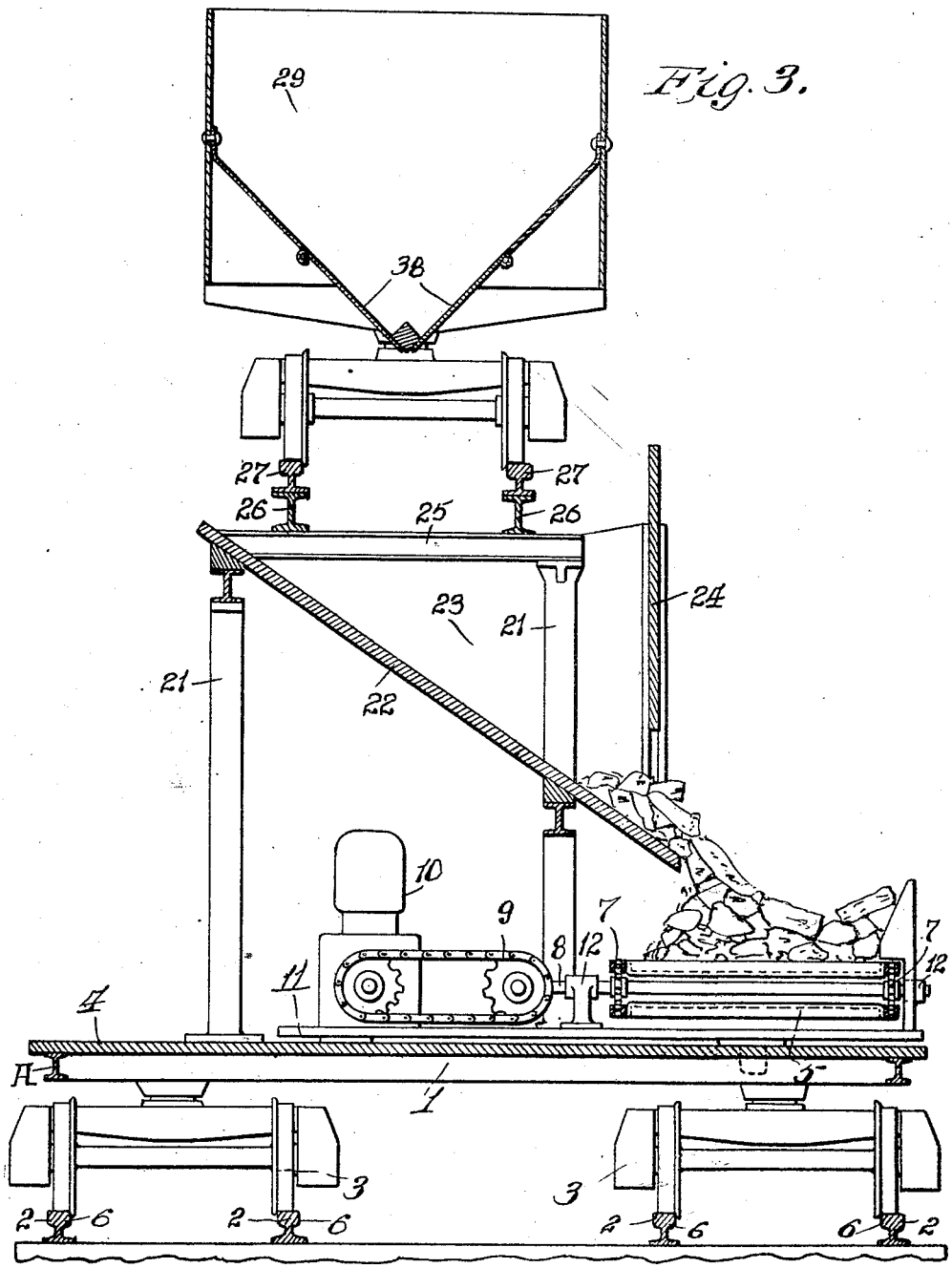

1,545,172

UNITED STATES PATENT OFFICE.

EDWARD W. SHUTT, OF PUEBLO, COLORADO.

CONVEYER SYSTEM.

Application filed August 7, 1920. Serial No. 401,890.

*To all whom it may concern:*

Be it known that I, EDWARD W. SHUTT, a citizen of the United States of America, and a resident of the city of Pueblo, in the county of Pueblo and State of Colorado, have invented certain new and useful Improvements in Conveyer Systems for the Building of Projected Embankments and the like, of which the following is a specification.

This invention is a furthering of the improvement shown and described in my United States Letters Patents No. 1,218,908, dated March 13th, 1917, No. 1293561 dated Feb. 4th, 1919, and my application for United States Letters Patent Serial Number 274,619 filed February 3rd, 1919, this invention, however, relating more particularly to a sidewise arrangement of conveyer for receiving material from the dumping cars when mounted thereabove.

The primary object of this invention is to provide an improved portable apparatus in the form of a plant for receiving material which is to be disposed of, such as slag or other waste material, and discharging the material forwardly from its place of deposit in or on the apparatus or plant.

Another object of the invention is to provide a conveying apparatus for automatically receiving material from conveying cars, and after receiving the material, convey and discharge the same into a leveled projected embankment ready for the reception of forwarding rails so that the apparatus may be moved thereon as the embankment work proceeds.

A further object of the invention is to provide a conveying apparatus with a side arranged combined receiving and forwardly discharging conveyer which is adapted to receive material from cars mounted upon a plane thereabove.

A still further object of the invention is to provide an apparatus which is comprised of a series of coupled together vehicles having a conveyer extending the length thereof, said conveyer being securely held at its ends to the respective end vehicles of the series of vehicles, and there being an inclined trackway leading to a plane above said conveyer.

Other and further objects will appear in the specification and be specifically pointed out in the appended claims, reference being had to the accompanying drawings exemplifying the invention, and in which, Figure 1 is a side elevation disclosing this improved conveyer system or apparatus.

Fig. 2 is a plan view of Figure 1.

Figure 3 is an enlarged transverse vertical section taken on the line III—III of Figure 1.

Figure 4 is an enlarged fragmentary transverse vertical section taken on the line IV—IV of Figure 1.

Referring by numerals to the accompanying drawings, the apparatus of this improved conveyer system is comprised of a series of coupled together especially constructed vehicles 1, each vehicle being supported on rails 2 by transversely aligning pairs of trucks 3, each vehicle having a platform 4.

Arranged to one side of the respective platforms of each of the vehicles in the series and horizontally extending thereover is an endless conveyer 5 which is preferably of bucket construction, the ends of said conveyer being securely supported to the respective end vehicles A.

Each of the trucks 3 are of the swivel type and on account of them being arranged in transversely aligning pairs, a pair of respective trackways 6 are provided, said pairs of trackways and the pairing arrangement of trucks mounted thereon being for the purpose of providing a wide ranged wheel tread for the support of the specially constructed series of vehicles 1 so as to support an upper structure to be hereinafter described.

The endless conveyer 5 is provided at its ends with the usual sets of driving sprockets 7 which are mounted on respective shafts 8, said shafts having traveling motion imparted thereto through the gearing 9 from the motor 10, said motor being mounted on a base 11 which is turnable on the platform 4, said base having a portion extending beneath the forward end of the conveyer 5, and extending upwardly from said base are a pair of bearings 12 for the support of the shaft 8.

The construction just mentioned relative to the motor 10 and the driving shaft 8 of the conveyer 5 is mounted adjacent the front end of the forwardly arranged vehicle A, whereas the opposite end of the conveyer 5 is supported above a turnable base 13 which is located adjacent the rear end of the last vehicle A in order, and extending upwardly from said base 13 are bearings 14 for the support of the rear arranged shaft 8.

Carried by the intermediately arranged vehicle or vehicles B are slidable supports 15 which support the intermediate portions of the conveyer, said supports being slidable for the purpose of accommodating the transverse travel or positioning of the platform of the vehicle B in the event that the plant, which is comprised of a series of coupled together vehicles, is being moved on a curve in the roadbed, or if the plant is positioned on the curve, the travel or movement of said slidable supports 15, being under the control however of the turnable base 11 of the forwardly arranged vehicle A and the turnable base 13 of the rearwardly arranged vehicle A.

Extended in any desirable manner from the front end of the first vehicle A in order is a horizontally swinging extension discharging conveyer 16 which is driven independently of the conveyer 5 by the motor 17, said conveyer 16 being extended over the embankment or fill 18, the rear end 19 of said conveyer 16 being arranged beneath the discharging end 20 of the conveyer 5.

Referring to the supporting construction related relative to the conveyer 5 being extended horizontally across a series of coupled together vehicles, it is readily seen that the theme is to positively secure the ends of the conveyer 5 to the respective end vehicles 8, while the intermediate portions of the conveyer are merely guided or sustained from the intermediately located vehicle or vehicles. In this connection, however, a suspension structure can be provided as extending from the first and last arranged vehicles A so that the intermediate portions of the conveyer 5 can be supported from such extension and not sustained in any manner from the intermediately located vehicles.

Mounted on the platform 4 of each vehicle is a series of vertically extending supports 21 and sustained by said supports of each vehicle is a combined receiving and deflecting platform 22, each of said platforms 22 serving as a bottom for a hopper 23 which is provided by the vertically lifting gates 24 which are co-operable with each platform 22.

Transversely mounted across the upper ends of pairs of the supports 21 is a cross member 25, and longitudinally arranged across said members and extending the approximate length of each of the vehicles 1 is a pair of rail supports 26 for the support of rails 27, each set of rails 27 as pertaining to each vehicle being joined by removable span rail sections such as designated at 28, said rails 27 and the adjoining rails 28 being for the reception of hopper bottom cars 29 which are moved up an incline car 30 bearing rails 31 and an incline car approach 32 bearing rails 33 which align with the rails 31, one of said rails 33 at its lower end resting on the inner rail C of a set of the roadbed rails 6, the other rail 33 at its lower end resting on an intermediately arranged rail D which is laid on the roadbed.

In the operation of this improved apparatus, the plant, which is comprised of the series of vehicles 1, is located on the sets of roadbed rails 6 wherein the discharging conveyer 16 thereon will extend over the embankment ready for the disposal of slag or other waste material which is to be discharged onto the plant from dumping cars such as 29 which are to be mounted thereover. These cars 29 are of the approximate length of each of the vehicles 1 so that when the dumping cars are inclined onto the rails 27 a car 29 will be mounted directly above a respective vehicle 1, the string of cars 29 to be conveyed onto the rails 27 from the rails C and D by attaching a cable to the first car 29 in order, said cable being drawn around a winding drum 34 which is under the control of a motor 35 carried by the forward vehicle A, said motor being under the control of the operator in the tower 36, and there being a cable such as 37 provided for returning the dump cars 29 down the incline car 30.

After the dumping cars 29 have been mounted above their respective vehicles 1 and platforms 22 the discharging doors 38 of the cars 29 are opened and their contents are discharged into their respective hoppers 23, and the gates 24 of said hoppers are graduatingly opened so as to discharge the contents of these respective hoppers unto the conveyer 5 where the material is carried forwardly and received by the discharging extension conveyer 16 to its place of deposit.

From the aforesaid, it is to be noted that a large amount of material can be deposited in the hoppers 23 so that a conveyer 5 can be kept running continually while other dumping cars are being brought to the plant for successive unloading, and as the embankment is extended on account of the continual discharge of the waste material thereover, other rails 6 are laid on the embankment forwardly of the first vehicle A and the plant is then moved ahead on the newly laid rails 6 by transmission gearing which may be related to the truck wheels 39 of the forward vehicle A and the motor 35 carried by said vehicle.

On account of the sidewise arrangement of the conveyer 5 large substances such as slag and the like can be freely discharged from the above arranged conveying hopper bottom cars onto the receiving and deflecting platforms 22 to said conveyer 5, without such substances clogging or jamming, and furthermore on account of the inclination of the platforms 22 the falling weight of large deposits is broken thereby relieving the conveyer 5 of the falling forces.

What I claim is:

1. A device for projecting embankments comprising a vehicle provided with a horizontally traveling conveyer which leads to a point adjacent the embankment, track rails leading from the track way on which the vehicle is mounted to a plane above and to one side of said conveyer, and a receiving platform located beneath said track rails provided with means for discharging material sidewise onto said conveyer.

2. A device for projecting embankments comprising the combination of a vehicle bearing a horizontally traveling conveyer which extends to a point adjacent the embankment, rails leading to a plane above said conveyer and to a position to one side of said conveyer, said rails above said conveyer being for the reception of loaded cars, and means provided whereby the material from said cars is deposited on said conveyer.

3. In projected embankment work, the combination of a vehicle bearing a horizontally traveling conveyer which leads to a point adjacent the embankment, rails leading from the road bed on which the vehicle is mounted to a plane above said conveyer and to a position to one side of said conveyer, and an extended conveyer leading from said other conveyer.

4. In projected embankment work, the combination of a vehicle bearing a horizontally traveling conveyer which extends to a point adjacent the embankment, rails leading to a plane above said conveyer and to a position to one side of said conveyer, said rails above said conveyer being for the reception of loaded cars, means provided whereby the material from said cars is deposited on said conveyer, and an extending conveyer leading from said other conveyer.

5. In a disposal plant, the combination of a vehicle bearing a horizontally extending conveyer, an inclined receiving platform located on a plane above said conveyer and sidewise thereto and trackways for the reception of a loaded vehicle located above said platform.

6. In a disposal plant, the combination of a vehicle bearing a horizontally extending conveyer, an inclined receiving platform located on a plane above said conveyer, trackways for the reception of a loaded vehicle located above said platform and to one side of said conveyer, and an extended conveyer in communication with said other conveyer.

7. A disposal apparatus comprising a series of vehicles arranged together so as to form a unit, a single conveyer extending over the combined length of all of said vehicles, means for adjusting said conveyer sidewise of said unit, and trackways for the reception of loaded cars arranged on a plane above said conveyer.

8. A disposal apparatus comprising a series of vehicles arranged together so as to form a unit, conveying means extending across the approximate length of all of said vehicles, trackways for the reception of loaded cars arranged on a plane above said conveyer and means forming part of the unit for moving the cars to a position on said trackways, said trackways leading from the roadbed on which said vehicles are mounted.

9. A disposal apparatus comprising a series of vehicles arranged together so as to form a unit, a single conveyer extending across the combined length of all of said vehicles, trackways for the reception of loaded cars arranged on a plane above said conveyer, means forming a part of the unit for conveying the cars to a position on said trackways, said means also providing for removing the cars from said trackways, and an extended conveyer leading from said other conveyer.

10. A disposal apparatus comprising a series of vehicles arranged together so as to form a unit, a single conveyer extending across all of said vehicles, trackways for the reception of loaded cars arranged on a plane above said conveyer, said trackways leading from the roadbed on which said vehicles are mounted, and means forming a part of the unit for drawing the cars upon said trackways.

11. A device for projecting embankments comprising the combination of a vehicle bearing horizontally traveling conveying means extending to a point adjacent the embankment, rails leading to a plane above said conveyer and to a position to one side of said conveyer, said rails above said conveyer being for the reception of loaded cars, and means provided whereby the material from said cars is deposited on said conveyer.

EDWARD W. SHUTT.